(12) United States Patent
Van Mullem et al.

(10) Patent No.: US 9,605,711 B2
(45) Date of Patent: Mar. 28, 2017

(54) APPARATUS AND METHOD FOR A BEARING ASSEMBLY SYSTEM

(71) Applicant: Telsmith, Inc., Mequon, WI (US)

(72) Inventors: Albert Van Mullem, Sussex, WI (US); Matthew Haven, Cedarburg, WI (US); Chuck Dricken, Kewaskum, WI (US); Sean Neitzel, Kronenwetter, WI (US)

(73) Assignee: Telsmith, Inc., Mequon, WI (US)

( * ) Notice: Subject to any disclaimer, the term of this patent is extended or adjusted under 35 U.S.C. 154(b) by 0 days.

(21) Appl. No.: 14/349,776

(22) PCT Filed: Oct. 5, 2012

(86) PCT No.: PCT/US2012/058883
§ 371 (c)(1),
(2) Date: Apr. 4, 2014

(87) PCT Pub. No.: WO2013/052754
PCT Pub. Date: Apr. 11, 2013

(65) Prior Publication Data
US 2015/0003760 A1    Jan. 1, 2015

Related U.S. Application Data

(60) Provisional application No. 61/626,981, filed on Oct. 6, 2011.

(51) Int. Cl.
*F16C 32/06* (2006.01)
*F16C 17/04* (2006.01)
*F16C 33/10* (2006.01)

(52) U.S. Cl.
CPC ........ *F16C 32/0659* (2013.01); *F16C 17/047* (2013.01); *F16C 32/0651* (2013.01); *F16C 32/0666* (2013.01); *F16C 33/1075* (2013.01); *F16C 2300/34* (2013.01); *F16C 2361/00* (2013.01)

(58) Field of Classification Search
CPC  F16C 17/047; F16C 32/0651; F16C 32/0655; F16C 32/0659; F16C 33/1065; F16C 33/1075; F16C 2361/00; F16C 2300/34
USPC .......................... 384/100, 121, 123, 368, 420
See application file for complete search history.

(56) References Cited

U.S. PATENT DOCUMENTS 4,227,753 A * 10/1980 Wilcock ........................ 384/105
4,348,065 A *  9/1982 Yoshioka et al. ............. 384/121
4,383,771 A *  5/1983 Freytag et al. ................ 384/121
(Continued)

*Primary Examiner* — James Pilkington
(74) *Attorney, Agent, or Firm* — Chambliss, Bahner & Stophel, P.C.

(57) ABSTRACT

A bearing assembly system adapted for use on a rock crusher having a main frame, a main shaft, an eccentric and a crushing head. The bearing assembly system comprises a first bearing ring which is disposed around the main shaft, a second bearing ring which is disposed adjacent to the first bearing ring, and a means for conveying fluid to at least one of the first bearing ring and the second bearing ring. In the preferred bearing assembly system at least one of the first bearing ring and the second bearing ring comprises a fluid depression. The preferred method further comprises conveying fluid from the means for conveying fluid to at least one of the first bearing ring and second bearing ring.

12 Claims, 10 Drawing Sheets

(56) References Cited

U.S. PATENT DOCUMENTS

| | | | |
|---|---|---|---|
| 4,765,760 A * | 8/1988 | Heshmat | F16N 7/22 |
| | | | 384/398 |
| 5,602,945 A * | 2/1997 | Davis | 384/368 |
| 5,931,394 A * | 8/1999 | Haven et al. | 241/30 |
| 5,944,265 A * | 8/1999 | Ganser et al. | 241/36 |
| 5,951,169 A * | 9/1999 | Oklejas | F16C 33/1065 |
| | | | 384/123 |
| 5,980,114 A * | 11/1999 | Oklejas, Jr. | F04D 29/041 |
| | | | 384/123 |
| 5,996,916 A * | 12/1999 | Musil | 241/215 |
| 2004/0035967 A1* | 2/2004 | Johnson et al. | 241/207 |
| 2005/0269436 A1* | 12/2005 | Sawant et al. | 241/215 |
| 2007/0160314 A1* | 7/2007 | Richie | F16C 17/065 |
| | | | 384/121 |
| 2010/0155512 A1* | 6/2010 | Persson | 241/27 |
| 2010/0193621 A1* | 8/2010 | Kaja | 241/209 |

* cited by examiner

APPARATUS AND METHOD FOR A BEARING ASSEMBLY SYSTEM

CROSS-REFERENCES TO RELATED APPLICATIONS/PATENTS

This application relates back to and claims priority from U.S. Provisional Application for Pat. No. 61/626,981 titled "Thrust Bearing System for a Rock Crusher" and filed on Oct. 6, 2011.

FIELD OF THE INVENTION

The present invention relates generally to bearing assemblies, and particularly to bearing assembly systems adapted for use on rock crushers.

BACKGROUND AND DESCRIPTION OF THE PRIOR ART

It is known to use roller bearings or spherical thrust bearings beneath the crusher shaft or bead of a rock crusher. Conventional roller bearings and spherical thrust bearings, however, suffer from one or more disadvantages. For example, conventional roller bearings and spherical thrust bearings are expensive. Conventional roller bearings and spherical thrust bearings also generate undesirable heat and have an undesirably short operable lifespan. Conventional roller bearings and spherical thrust bearings also have an undesirably low load capacity. In addition, conventional roller bearings and spherical thrust bearings are difficult to maintain, repair and replace.

It would be desirable, therefore, if an apparatus and method for a bearing assembly system could be provided that would reduce the cost of the bearings. It would also be desirable if such an apparatus and method could be provided that would reduce the heat generated by the bearings and increase the operable lifespan of the bearings. It would be further desirable if such an apparatus and method could be provided that would increase the load capacity of the bearings.

It would be still further desirable if such an apparatus and method could be provided that would simplify the maintenance, repair and replacement of the bearings.

ADVANTAGES OF THE PREFERRED EMBODIMENTS OF THE INVENTION

Accordingly, it is an advantage of the preferred embodiments of the invention claimed herein to provide an apparatus and method for a bearing assembly system that reduces the cost of the bearings. It is also an advantage of the preferred embodiments of the invention claimed herein to provide an apparatus and method for a bearing assembly system that reduces the heat generated by the bearings and increases the operable lifespan of the bearings. It is a further advantage of the preferred embodiments of the invention claimed herein to provide an apparatus and method for a bearing assembly system that increases the load capacity of the bearings. It is a still former advantage of the preferred embodiments of the invention claimed herein to provide an apparatus and method for a bearing assembly system that simplifies the maintenance, repair and replacement of the bearings.

Additional advantages of the preferred embodiments of the invention will become apparent from an examination of the drawings and the ensuing description.

EXPLANATION OF THE TECHNICAL TERMS

As used herein, the term "fluid depression" means any groove, channel, pocket, ramp or other area on the bearing contacting surface that is adapted to receive, collect and/or distribute pressurized fluid.

As used herein, the terms "ring" includes, without limitation, a singular ring or a plurality of ring segments or a singular ring or a plurality of ring segments incorporated into the eccentric, main frame and/or crushing head.

SUMMARY OF THE INVENTION

The apparatus of the invention comprises a bearing assembly system adapted for use on a rock crusher having a main frame, a main shaft an eccentric and a crushing head. The bearing assembly system comprises a first bearing ring which is disposed around the main shaft, a second bearing ring which is disposed adjacent to the first bearing ring, and a means for conveying fluid to at least one of the first bearing ring and the second bearing ring. In the preferred bearing assembly system at least one of the first bearing ring and the second bearing ring comprises a fluid depression.

The method of the invention comprises a method for a bearing assembly system, said method comprising providing a bearing assembly system. The preferred bearing assembly system is adapted for use on a rock crusher having a main frame, a main shaft, an eccentric and a crushing head. The preferred bearing assembly system comprises a first bearing ring which is disposed around the main shaft, a second bearing ring which is disposed adjacent to the first bearing ring, and a means for conveying fluid to at least one of the first bearing ring and the second bearing ring. In the preferred bearing assembly system at least one of the first bearing ring and the second bearing ring comprises a fluid depression. The preferred method further comprises conveying fluid from the means for conveying fluid to at least one of the first bearing ring and second bearing ring.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Figure 1:
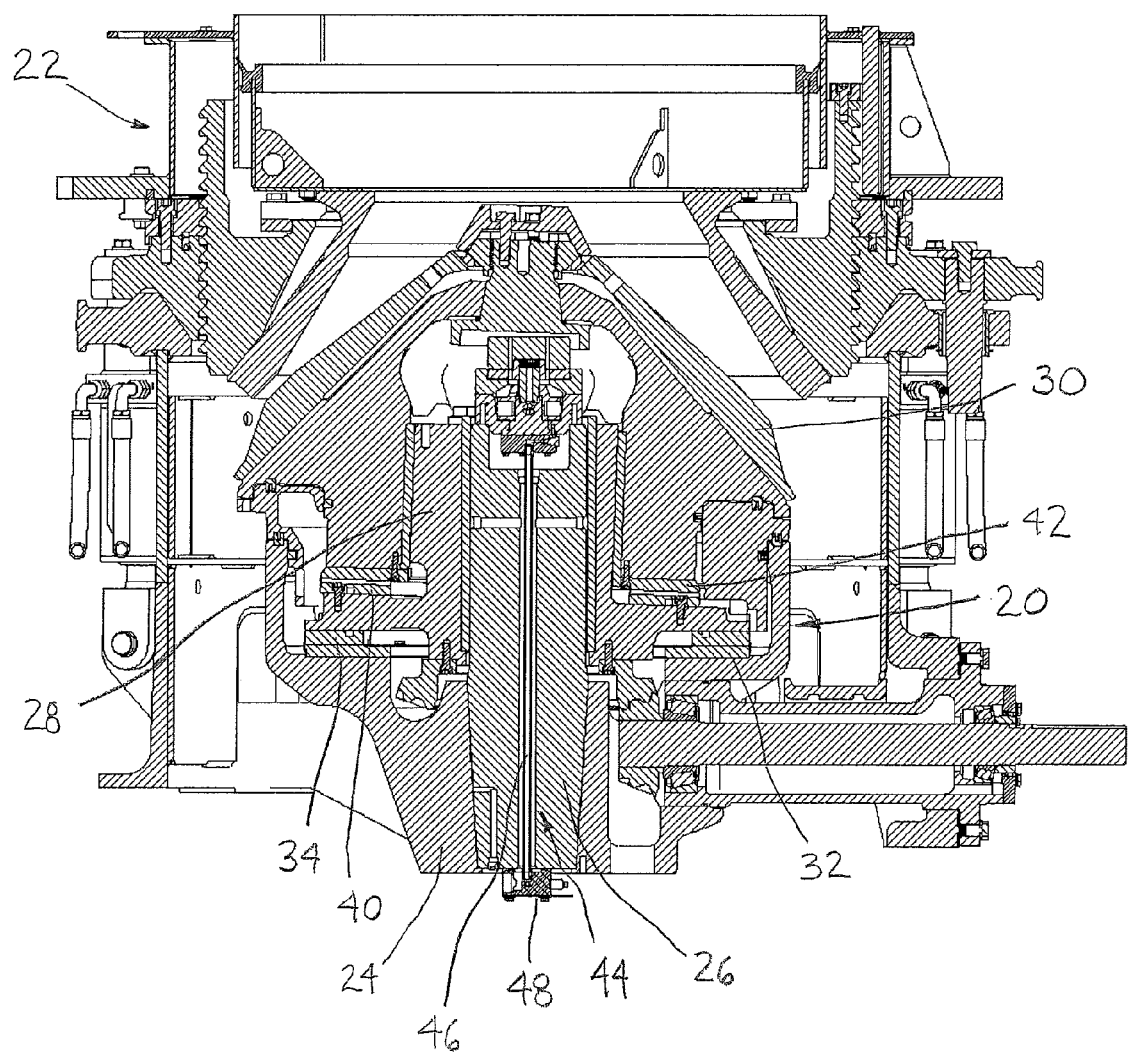
FIG. 1 is a sectional front view of the preferred embodiment of the bearing assembly system in accordance with the present invention.

Referring now to the drawings, the preferred embodiments of the bearing assembly system in accordance with the present invention is illustrated by FIGS. 1 through 11. As shown in FIGS. 1-11, the preferred bearing assembly system is adapted to reduce the cost of the bearings. The preferred embodiments of the invention claimed herein also provide an apparatus and method for a bearing assembly system that reduces the Heat generated by the bearings and increases the operable lifespan of the bearings. The preferred embodiments of the invention claimed herein further provide an apparatus and method for a bearing assembly system that increases the load capacity of the bearings. The preferred embodiments of the invention claimed herein still further provide an apparatus and method for a bearing assembly system that simplifies the maintenance, repair and replacement of the bearings.

Referring now to FIG. 1, a sectional front view of the preferred embodiment of the bearing assembly system in accordance with the present invention is illustrated. As shown in FIG. 1 the preferred bearing assembly system is designated generally by reference numeral 20. Preferred bearing assembly system 20 is adapted for use on rock crusher 22 having main frame 24, main shaft 26, eccentric 28 and crushing head 30. In the preferred embodiments of bearing assembly system 20, the bearing assembly system is adapted to support the loads of or on the crushing head 30 and the loads from the crushing head are transmitted to main frame 24 directly or indirectly via the bearings.

Still referring to FIG. 1 preferred bearing assembly 20 comprises a first bearing ring such as lower flat bearing ring 32 which is disposed around main shaft 26 and a second bearing ring such as lower ramped bearing ring 34 which is disposed adjacent to the first bearing ring. Preferably, lower flat bearing ring 32 is disposed on the main frame and the lower ramped bearing ring 34 is disposed on eccentric 28. In the preferred embodiments of the bearing assembly system, at least one of the first bearing ring and the second bearing ring comprises a fluid depression. Preferably, the fluid depression is a substantially closed fluid depression defined in part by an inner circumference fluid depression wall that substantially prevents pressurized fluid from being conveyed radially inwardly from the bearing rings and an outer circumference fluid depression wall that substantially prevents pressurized fluid from being conveyed radially outwardly from the bearing rings. The preferred lower flat bearing ring 32 and lower ramped bearing ring 34 are adapted to be hydrostatically separated before start-up and hydrodynamically separated from each other upon start-up (i.e. upon rotation) ensuring that there is no contact between the bearing rings during normal operation of the rock crusher. The preferred bearing assembly system 20 also comprises a third bearing ring such as upper ramped bearing ring 40 which is disposed around the main shaft 26 and a fourth bearing ring such as upper flat bearing ring 42 which is disposed adjacent to the third bearing ring. Preferably, upper ramped bearing ring 40 is disposed on eccentric 28 and upper flat bearing ring 42 is disposed on crushing head 30. While FIG. 1 illustrates the preferred configuration and arrangement of the bearing rings, it is contemplated within the scope of the invention that the bearing rings may be of any suitable configuration and arrangement. For example, it is contemplated within the scope of the invention that the ramped bearing ring may be disposed on the main frame and the flat bearing ring may be disposed on the eccentric.

Still referring to FIG. 1, preferred bearing assembly system 20 also comprises a means for conveying fluid to at least one of the first bearing ring and second bearing ring. The preferred means for conveying fluid to at least one of the first bearing ring and second bearing ring is an oil supply assembly 44 which comprises conduit 46 and fluid source 48. Preferably, the same means for conveying fluid to at least one of the first and second bearing rings is also adapted to convey fluid to at least one of the third bearing ring and fourth bearing ring. While FIG. 1 illustrates the preferred configuration and arrangement of the means for conveying fluid to the bearing rings, it is contemplated within the scope of the invention that the means for conveying fluid to the bearing rings may be of any suitable configuration and arrangement.

Figure 2:
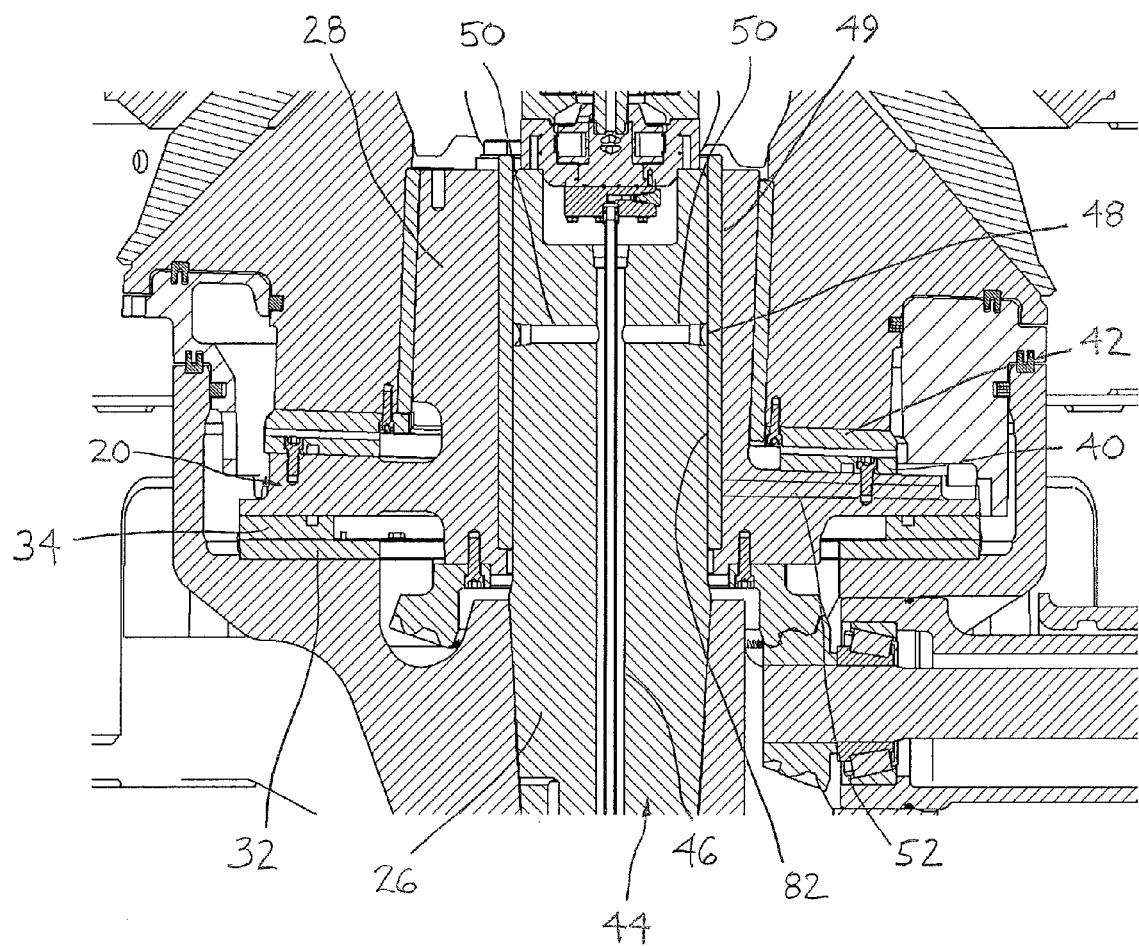
FIG. 2 is a sectional front view of the preferred bearing assembly system illustrated in FIG. 1.

Referring now to FIG. 2, a sectional front view of preferred bearing assembly system 20 is illustrated. As shown in FIG. 2, preferred bearing assembly system 20 comprises lower flat bearing ring 32, lower ramped bearing ring 34, upper ramped bearing ring 40, upper flat bearing ring 42, oil supply assembly 44 and conduit 46. In the preferred embodiments of the invention, flat bearing ring 32 and ramped bearing ring 34 bear against each other before pressurizing the system with fluid. Pressurized oil is conveyed to main shaft 26 of the crusher from the bottom of the shaft toward the top of the shaft. The pressurized oil is then conveyed by radial conduits 50 to annular chamber 48 which is defined by the outside wall of main shaft 26 and the inside wall of inner sleeve 49. The pressurized oil in annular chamber 48 is conveyed into the vertical slot in the rotating inner sleeve 49 which is mounted to the rotating eccentric 28. Because annular chamber 48 surrounds main shaft 26, oil can consistently flow into rotating inner sleeve 49. The pressurized oil then flows through the vertical slot in inner sleeve 49 and is conveyed to eccentric 28 through radial conduits 52. The preferred radial conduits 52 are in fluid communication with the oil inlet holes in each of the ramped bearing rings 34 and 40. While FIG. 2 illustrates the configuration and arrangement of the preferred means for conveying fluid to the bearing rings, it is contemplated within the scope of the invention that the means for conveying fluid to the bearing rings may be of any suitable configuration and arrangement.

Figure 3:
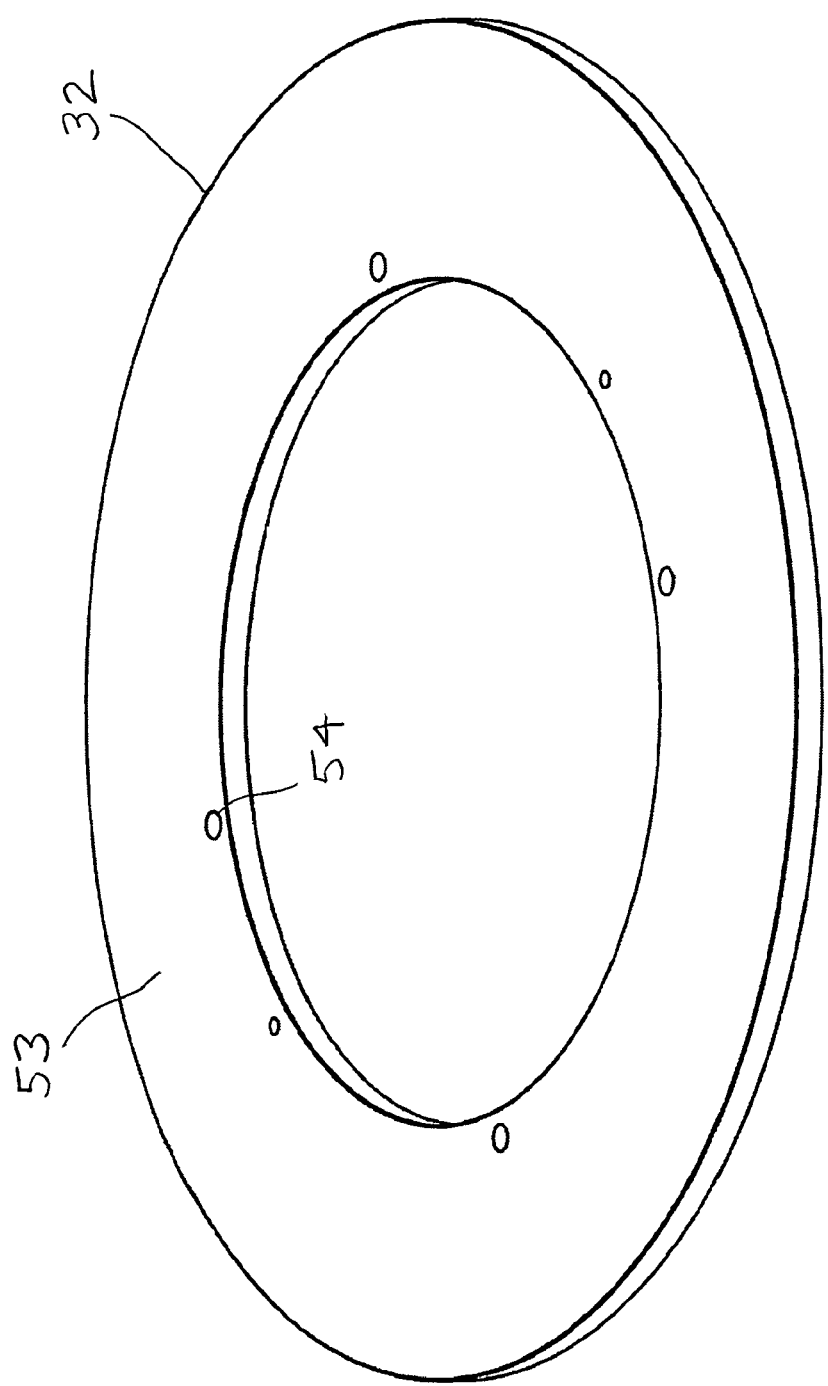
FIG. 3 is a perspective view of the preferred flat bearing ring of the bearing assembly system illustrated in FIGS. 1-2.

Referring now to FIG. 3, a perspective view of preferred lower flat bearing ring 32 of bearing assembly system 20 is illustrated. As shown in FIG. 3, preferred flat bearing ring comprises substantially flat bearing surface 53 is adapted to bear against ramped lower bearing ring 34 and a plurality of apertures 54 which are adapted receive fastening devices. While FIG. 3 illustrates the preferred configuration, and arrangement of the flat bearing ring, it is contemplated within the scope of the invention that the flat bearing ring may be of any suitable configuration and arrangement.

Figure 4:
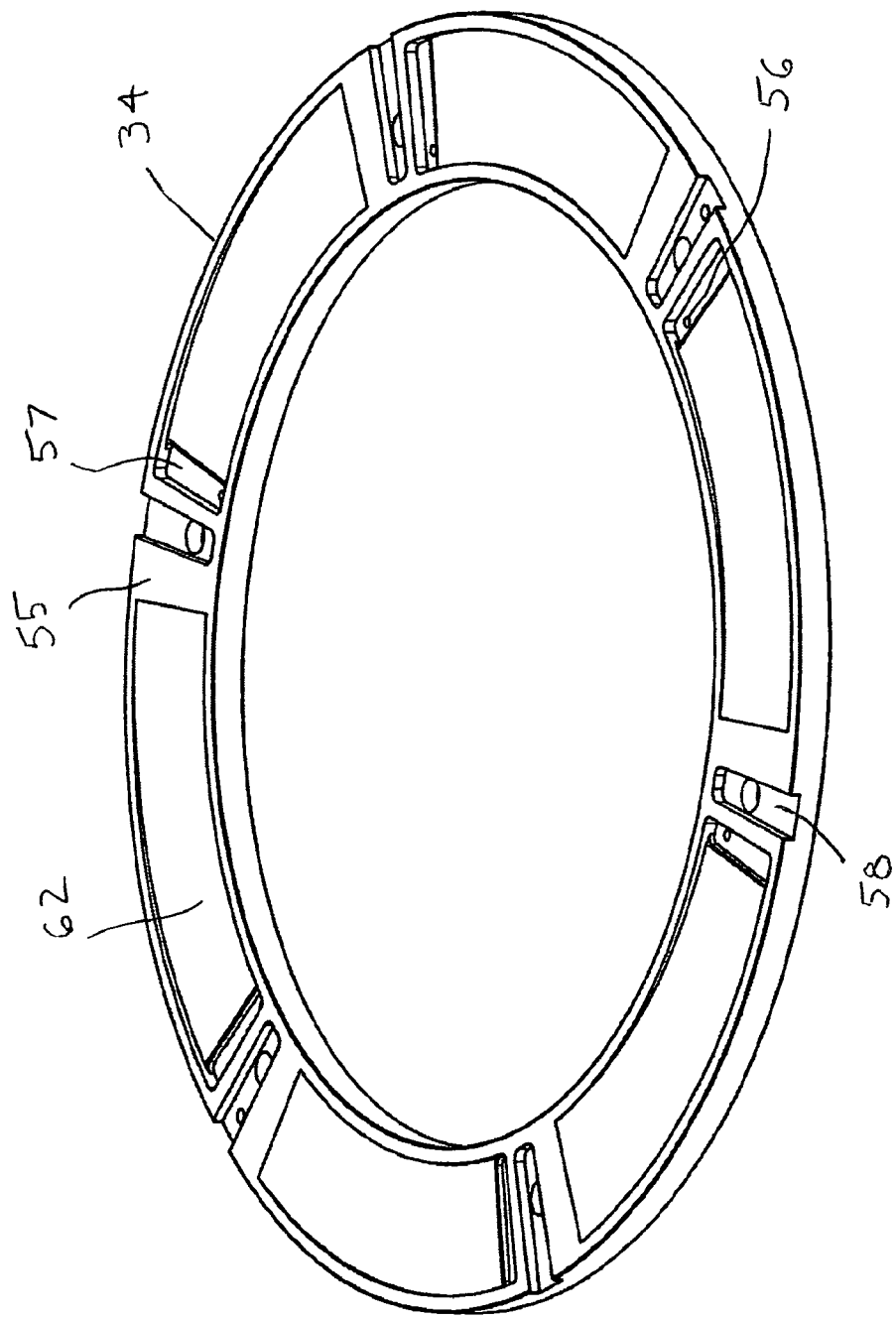
FIG. 4 is a perspective view of the preferred ramped bearing ring of the bearing assembly system illustrated in FIGS. 1-2.

Referring now to FIG. 4, a perspective view of preferred ramped bearing ring 34 in accordance with the present invention is illustrated. As shown in FIG. 4, preferred bearing ring 34 includes flat bearing surface 55, fluid feed inlet 56, fluid feed pocket 57, fluid outlet 58, and ramped pocket 62. While FIG. 4 illustrates the preferred configuration and arrangement of the preferred ramped bearing ring, it is contemplated within the scope of the invention that the ramped bearing ring may be of any suitable configuration and arrangement. For example, it is contemplated within the scope of the invention that the ramped bearing ring may not include any fluid outlets such that pressurized oil exits the system from the sides of the bearing rings.

Figure 5:
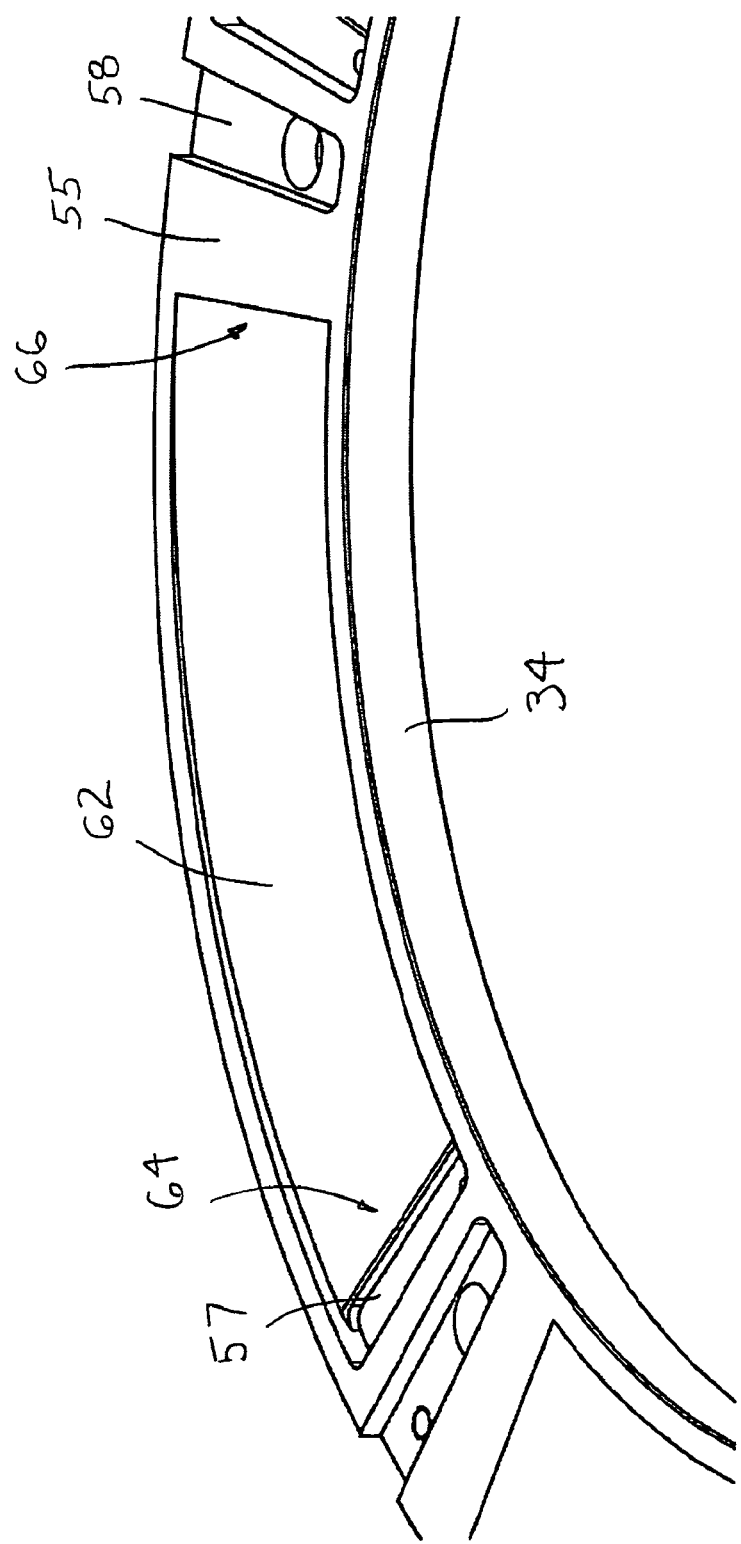
FIG. 5 is a perspective view of the preferred ramped bearing ring of the bearing assembly system illustrated in FIGS. 1-2 and 4.

Referring now to FIG. 5, a perspective view of preferred lower ramped bearing ring 34 of bearing assembly system 20 is illustrated. As shown in FIG. 5, preferred lower ramped bearing ring 34 comprises ramped pocket 62 which slopes from lower end 64 adjacent to fluid feed pocket 57 to upper end 66 adjacent to fluid outlet 58.

Figure 6:
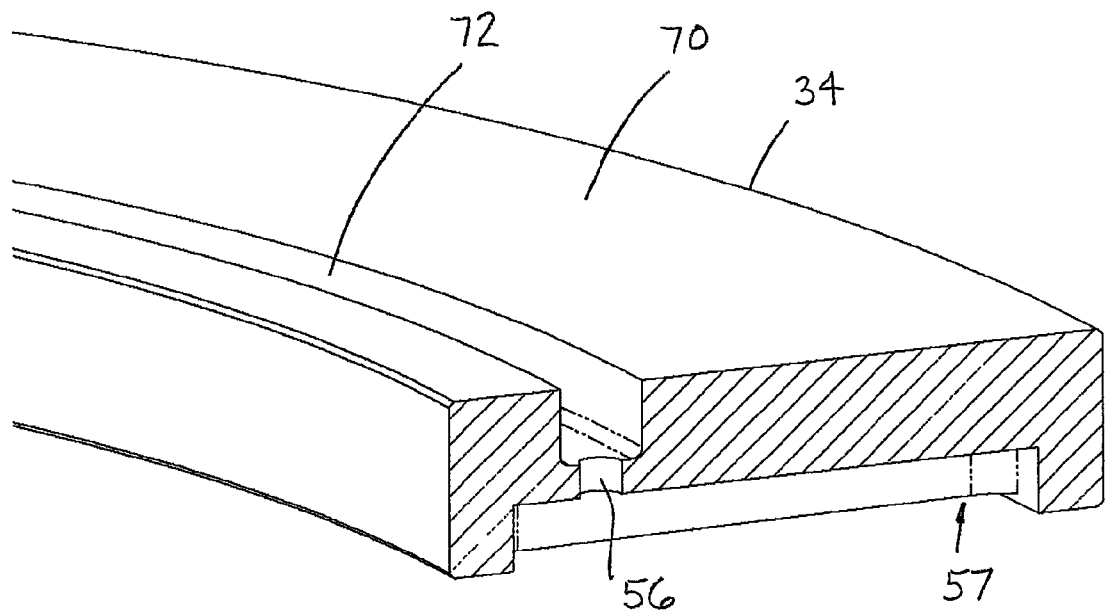
FIG. 6 is a sectional perspective view of the preferred ramped bearing ring of the bearing assembly system illustrated in FIGS. 1-2 and 4-5.

Referring now to FIG. 6, a sectional perspective view of the preferred lower ramped bearing ring 34 of bearing assembly system 20 is illustrated. As shown in FIG. 6, preferred lower ramped bearing ring 34 comprises substantially flat side 70 which is opposite ramped bearing pocket 62. Preferred substantially flat side 70 includes outer channel 72 which is in fluid communication with fluid feed pockets 57. In the preferred embodiments, the hydrostatic operation of the bearing assembly system allows for low speed, low load operation during machine start-up. Before the crusher is started (before rotation starts), the preferred system conveys pressurised oil to a pair of bearing rings. Oil enters each of the ramped pockets (each ramped bearing ring preferably has multiple bearing pads) through fluid feed inlet 56. Pressurized oil fills the fluid feed pocket 57 and the ramped pocket 62. Preferred ramped pocket 62 preferably starts at a depth at lower end 64 and slopes toward the flat surface plane at upper end 66 disposed at the opposite end of the ramped pocket. The pressure over this area gives hydrostatic lift, providing separation between the ramped bearing ring and flat bearing ring. As the parts separate, oil will be conveyed past the flat face of the bearing out of the ramped pocket area and over the sides. The amount of lift achieved depends upon the oil flow rate.

After the crusher is started and it begins to rotate, flat bearing ring 32 and ramped bearing ring 34 are already separated by the hydrostatic type oil film described above. As the crusher speed increases, the relative motion between flat bearing ring 32 and flat bearing ring 34 also increases. This relative motion causes the oil in the fluid feed pocket 57 to be "dragged" by its viscosity into the lower end 64 of ramped pocket 62. Once in the ramped pocket 62, the oil is forced into the converging volume between the taper (wedge) and the mating flat bearing ring by its viscosity. This wedging action creates pressure and urges the flat bearing ring away from the ramped pocket with a force capable of supporting the vertical crushing load. The bearing assembly system preferably operates at a very close clearance (preferably less than 0.003") when loaded. The small clearance adequately forms a seal between the flat surfaces surrounding the ramps and the flat bearing ring and oil leakage is minimized or eliminated.

Figure 7:
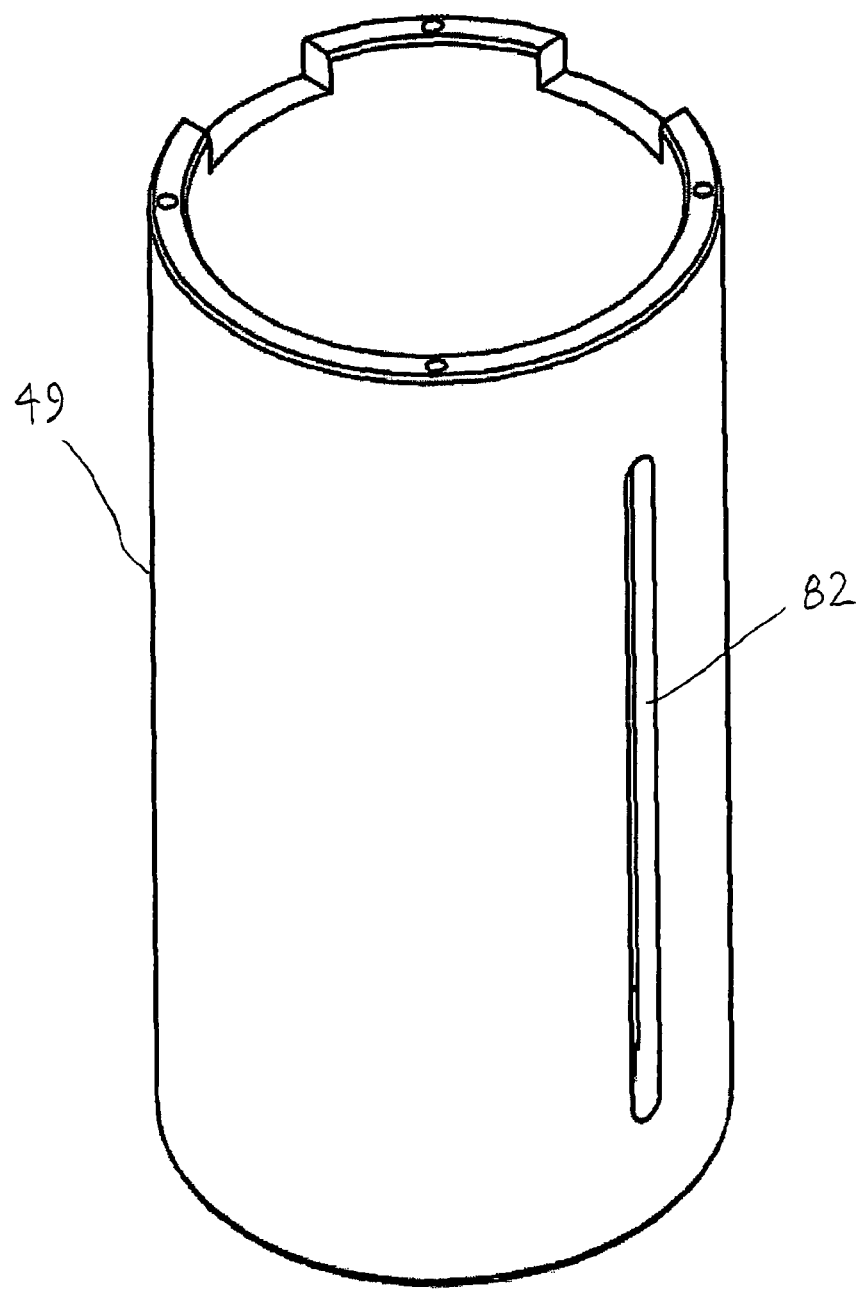
FIG. 7 is a perspective view of the preferred inner sleeve of the bearing assembly system illustrated in FIGS. 1-2 and 4-6.

Referring now to FIG. 7, a perspective view of preferred inner sleeve 49 of bearing assembly system 20 is illustrated. As shown in FIG. 7, preferred inner sleeve 49 includes vertical slot 82. While FIG. 7 illustrates the preferred configuration and arrangement of the inner sleeve, it is contemplated within the scope of the invention that the inner sleeve may be of any suitable configuration and arrangement.

Figure 8:
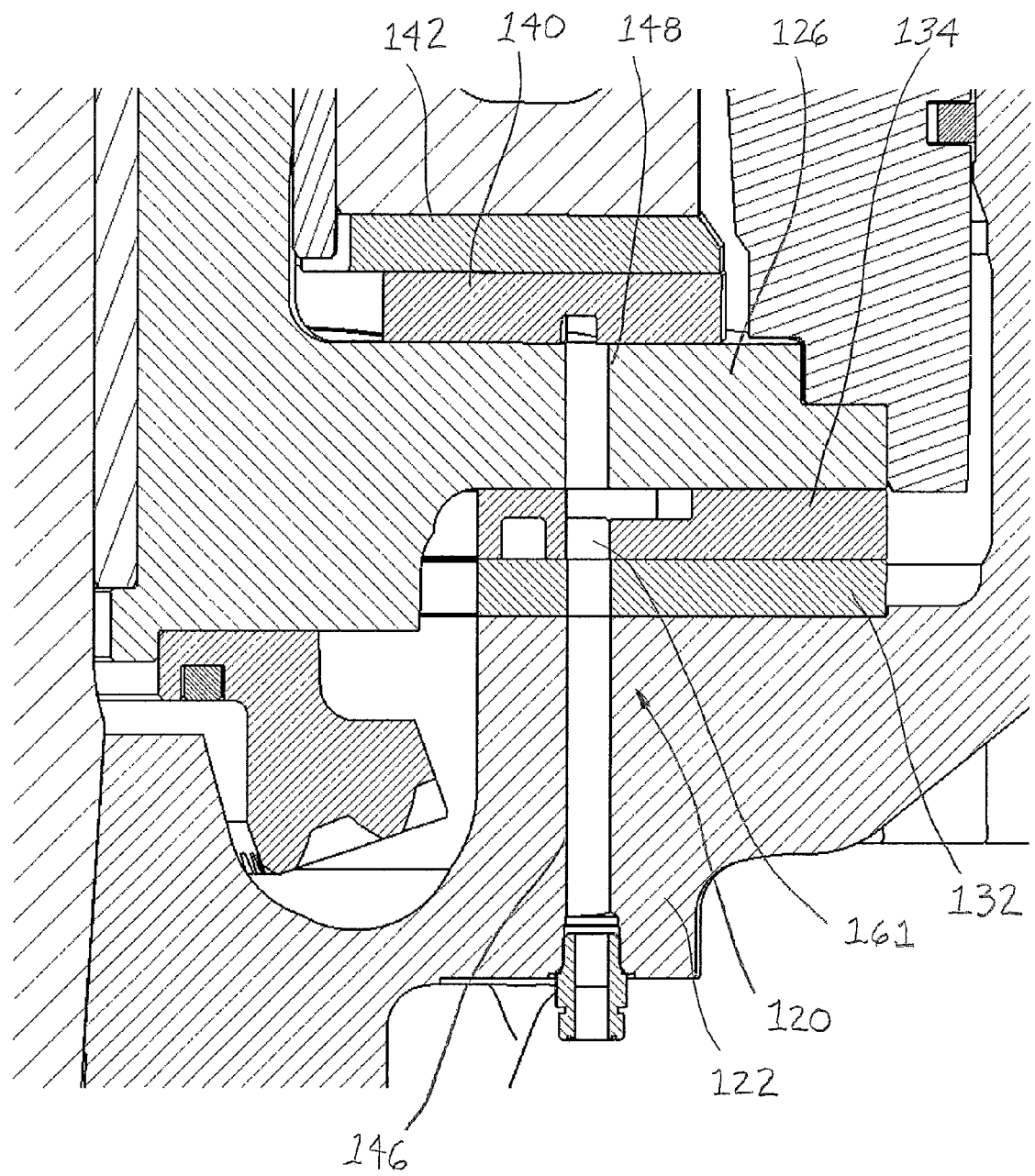
FIG. 8 is a sectional front view of a first alternative embodiment of the preferred bearing assembly system in accordance with the present invention.

Referring now to FIG. 8, a sectional front view of a first alternative embodiment of the preferred bearing assembly system in accordance with the present invention is illustrated. As shown in FIG. 8, the first alternative embodiment of the bearing assembly system is designated generally by reference numeral 120. Preferred bearing assembly system 120 comprises lower flat bearing ring 132, lower ramped bearing ring 134, upper ramped bearing ring 140 and upper flat bearing ring 142. Preferred lower flat bearing ring 132 is disposed on main frame 122, preferred lower ramped bearing ring 134 is disposed on eccentric 126, preferred upper ramped bearing ring 140 is disposed on eccentric 126 and preferred upper flat bearing ring 142 is disposed on the crushing head. In preferred bearing assembly system 120, pressurised oil is conveyed to the lower bearing rings via main frame conduit 146 which passes through main frame 122. Preferably, the pressurized oil is conveyed through flat bearing ring 132 to rotary groove 161 in ramped bearing ring 134. Preferred rotary groove 161 maintains a connection with flat bearing ring 132 even when ramped bearing ring 134 is rotating. Pressurised oil is conveyed from lower ramped bearing ring 134 to upper ramped bearing ring 140 via eccentric conduit 148. While FIG. 8 illustrates the preferred configuration and arrangement of the first alternative embodiment of the bearing assembly system, it is contemplated within the scope of the invention that the bearing assembly system may be of any suitable configuration and arrangement.

Figure 9:
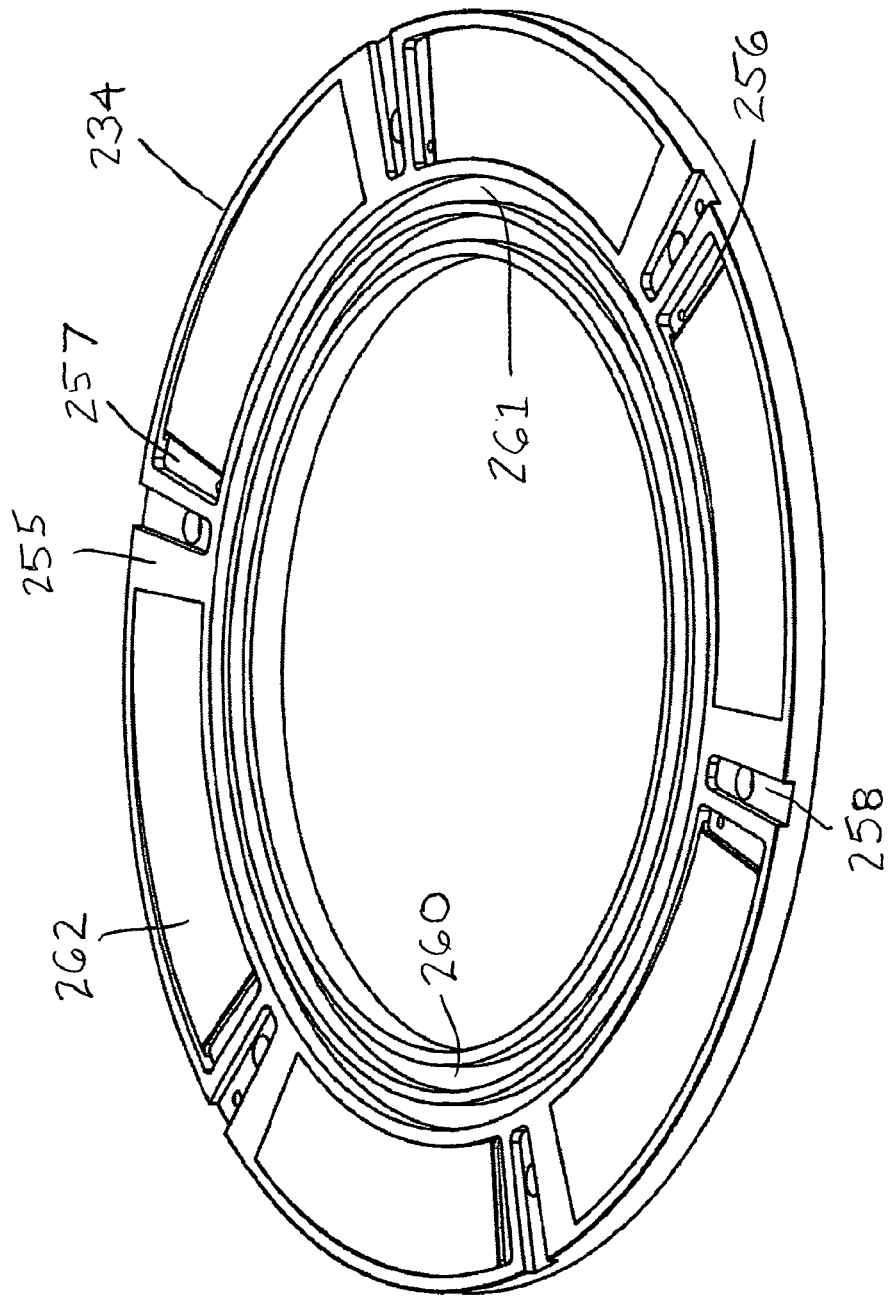
FIG. 9 is a perspective view of a first alternative embodiment of the preferred ramped bearing ring in accordance with the present invention.

Referring now to FIG. 9, a perspective view of a first alternative embodiment of the lower ramped bearing ring in accordance with the present invention is illustrated. As shown in FIG. 9, the first alternative embodiment, of the lower ramped bearing ring is designated generally by reference numeral 234. Preferred lower ramped bearing ring 234 comprises flat bearing surface 255 which is adapted to bear against the substantially flat bearing surface of the lower flat bearing ring. More particularly, preferred lower ramped bearing ring 234 includes fluid feed inlet 256, fluid feed pocket 257, fluid outlet 258, first rotary groove 260, second rotary groove 261 and ramped pocket 262. While FIG. 9 illustrates the preferred configuration and arrangement of ramped bearing ring 234, it is contemplated within the scope of the invention that the ramped bearing ring may be of any suitable configuration and arrangement.

Figure 10:
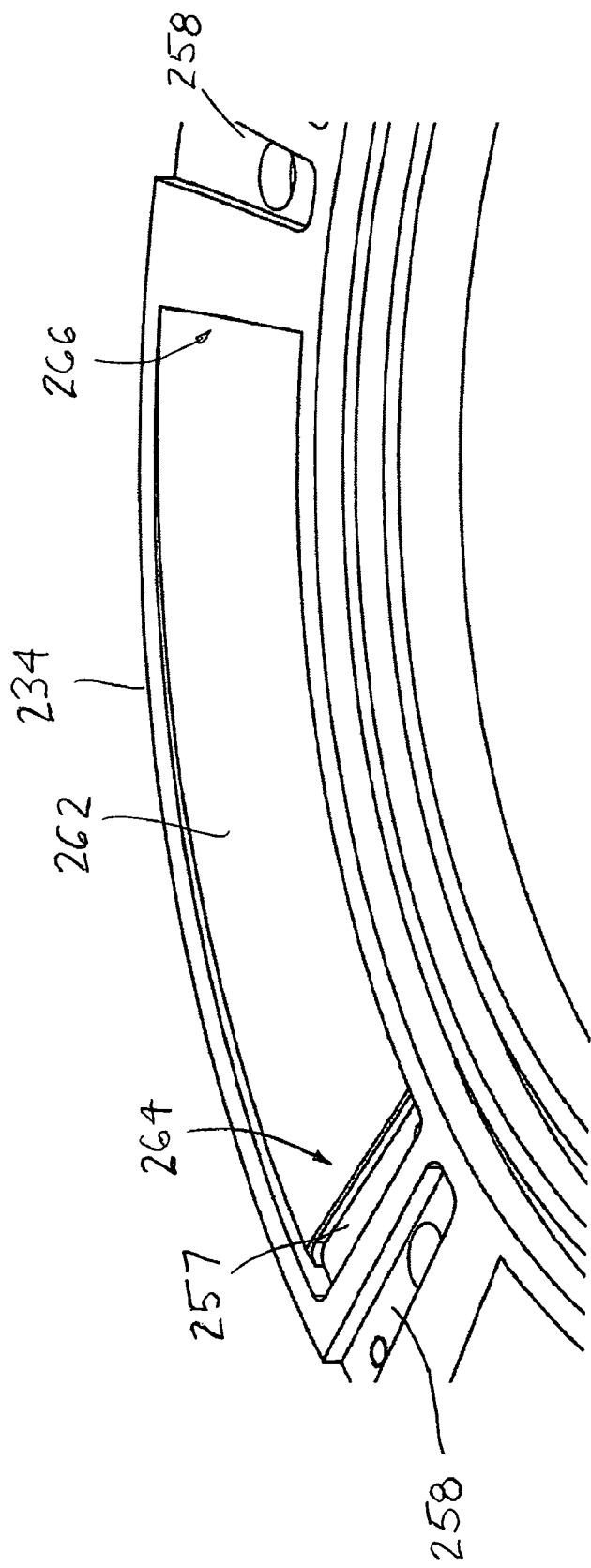
FIG. 10 is a perspective view of the first alternative embodiment of the preferred ramped bearing ring illustrated in FIG. 9.

Referring now to FIG. 10, a perspective view of preferred lower ramped bearing ring 234 of bearing assembly system 20 is illustrated. As shown in FIG. 10, preferred lower ramped bearing ring 234 comprises ramped pocket 262 which slopes from lower end 264 adjacent to fluid feed pocket 257 to upper end 266 adjacent to fluid outlet 258.

Figure 11:
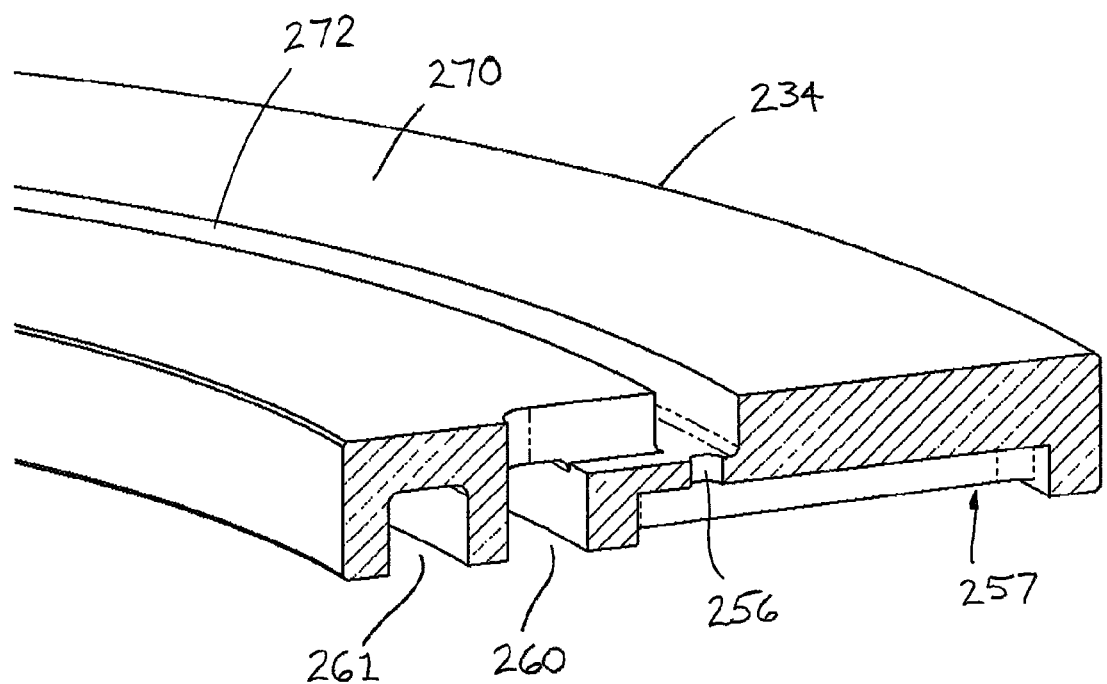
FIG. 11 is a sectional perspective view of the first alternative embodiment of the preferred ramped bearing ring illustrated in FIGS. 9-10.

Referring now to FIG. 11, a sectional perspective view of the preferred lower ramped bearing ring 234 is illustrated. As shown in FIG. 11, preferred lower ramped bearing ring 234 comprises substantially flat side 270 which is opposite ramped bearing pocket 262. Preferred substantially flat side 270 includes outer channel 272 which is in fluid communication with fluid feed pockets 257 and rotary groove 260. In addition, preferred rotary grooves 260 and 261 are adapted to convey pressurized oil into the necessary bearing regions and support for the crushing head during low speed (start-up) conditions. Preferably, rotary grooves 260 and 261 are incorporated into ramped bearing ring 234 and are adapted to distribute pressurized oil through the bearing. Preferred rotary grooves 260 and 261 also may contribute hydrostatic lift during low velocity conditions such as start-up. The preferred ramped bearing ring comprises two rotary grooves, each of which is connected independently to the rotating eccentric to control oil flow to each bearing. It is also contemplated within the scope of the invention that one or more rotary grooves may be adapted to convey pressurized oil to a different set of bearings.

In operation, several advantages of the preferred embodiments of the bearing assembly system are achieved. For example, the preferred embodiments of the bearing assembly system are adapted to reduce the cost of the bearings. The preferred embodiments of the invention claimed herein also provide an apparatus and method for a bearing assembly system that reduces the heat generated by the bearings and increases the operable lifespan of the bearings. The preferred embodiments of the invention claimed hereto farther provide an apparatus and method for a bearing assembly system that increases the load capacity of the bearings. The preferred embodiments of the invention claimed herein still further provide an apparatus and method for a bearing assembly system that simplifies the maintenance, repair and replacement of the bearings.

The preferred hybrid hydrostatic-hydrodynamic bearing assembly system also supports the crushing head loads. Preferably, the bearing rings have a larger diameter than the typical spherical design in order to provide more surface area (less load per unit area) and increased relative surface velocity which produces hydrodynamic separation. The preferred hydrodynamic bearings are less expensive and have smaller dimensional cross-section and a longer operable life span than conventional roller bearings designs. Further, the preferred oil film developing ramps are made with steel for durability. Conventional ramped, rings include ramps made from bronze.

The preferred hybrid, hydrostatic-hydrodynamic bearing assembly system may be located between both the crushing head and the eccentric and the eccentric and the crusher frame. Crushing forces and component weights are support by the frame through the bearing assembly system as the eccentric rotates. A series of grooves feed pressurized oil into the bearing assembly system to provide separation between the ramped bearing ring and the flat bearing ring. The interconnected oil grooves are included in the crusher frame, eccentric and bearing rings.

The configuration and arrangement of the preferred bearing assembly system conveys the thrust loads directly to the crusher frame instead of through the main shaft as in conventional designs. As a result, the crusher frame may be lighter because the crusher forces are closer to the supporting arms of the frame.

Although this description contains many specifics, these should not be construed as limiting the scope of the invention bat as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A bearing assembly system installed in a rock crusher having a main frame, a main shaft, an eccentric and a crushing head, said bearing assembly system comprising:
    (a) a first bearing ring, said first bearing ring being disposed around the main shaft and on the eccentric;
    (b) a second bearing ring, said second bearing ring being disposed adjacent to the first bearing ring and the main frame;
    (c) a third bearing ring, said third bearing ring being disposed around the main shaft and on the eccentric;
    (d) a fourth bearing ring, said fourth bearing ring being disposed adjacent to the third bearing ring and on the crushing head;
    (e) a means for conveying fluid to at least one of the first bearing ring and the second bearing ring and to at least one of the third bearing ring and the fourth bearing ring, said means for conveying fluid being adapted to convey a pressurized fluid;
    wherein at least one of the first bearing ring and the second bearing ring and at least one of the third bearing ring and the fourth bearing ring comprises a substantially closed fluid depression that is adapted to receive and collect the pressurized fluid, said substantially closed fluid depression comprising an inner circumference fluid depression wall that substantially prevents the pressurized fluid from being conveyed radially inwardly from the bearing rings and an outer circumference fluid depression wall that substantially prevents the pressurized fluid from being conveyed radially outwardly from the bearing rings; and wherein the first bearing ring and the second bearing ring are adapted to be hydrostatically separated before start-up; and wherein the bearing assembly system conveys thrust loads directly to the main frame.

2. The bearing assembly system of claim 1 wherein the second bearing ring comprises a fluid feed inlet.

3. The bearing assembly system of claim 1 wherein the second bearing ring comprises a fluid feed pocket.

4. The bearing assembly system of claim 1 wherein the second bearing ring comprises a fluid outlet.

5. The bearing assembly system of claim 1 wherein the second bearing ring comprises a rotary groove.

6. The bearing assembly system of claim 1 wherein the second bearing ring comprises a ramp.

7. The bearing assembly system of claim 1 wherein the means for conveying fluid to at least one of the first bearing ring and the second bearing ring and to at least one of the third bearing ring and the fourth bearing ring comprises a conduit.

8. The bearing assembly system of claim 1 wherein the means for conveying fluid to at least one of the first bearing ring and the second bearing ring and to at least one of the third bearing ring and the fourth bearing ring comprises a fluid source.

9. The bearing assembly system of claim 1 wherein the first bearing ring and the second bearing ring are adapted to be hydrodynamically separated from each other after start-up.

10. The bearing assembly system of claim 1 wherein the means for conveying fluid comprises an oil supply assembly that is adapted to supply oil to at least one of the first bearing ring and the second bearing rings.

11. A bearing assembly system installed in a rock crusher having a main frame, a main shaft, an eccentric and a crushing head, said bearing assembly system comprising:
    (a) a first bearing ring, said first bearing ring being disposed around the main shaft and on the eccentric;
    (b) a second bearing ring, said second bearing ring being disposed adjacent to the first bearing ring and on the main framed;
    (c) a third bearing ring, said third bearing ring being disposed around the main shaft and on the eccentric;
    (d) a fourth bearing ring, said fourth bearing ring being disposed adjacent to the third bearing ring and on the crushing head;
    (e) a means for conveying fluid to at least one of the first bearing ring and the second bearing ring and to at least one of the third bearing ring and the fourth bearing ring, said means for conveying fluid being adapted to convey a pressurized fluid;

wherein at least one of the first bearing ring and the second bearing ring and at least one of the third bearing ring and the fourth bearing ring comprises a substantially closed fluid depression that is adapted to receive and collect the pressurized fluid, said substantially closed fluid depression comprising an inner circumference fluid depression wall that substantially prevents the pressurized fluid from being conveyed radially inwardly from the bearing rings and an outer circumference fluid depression wall that substantially prevents the pressurized fluid from being conveyed radially outwardly from the bearing rings; and wherein the substantially closed fluid depression receives the pressurized fluid via a fluid feed inlet that is spaced apart from the inner circumference fluid depression wall; and wherein the first bearing ring and the second bearing ring are adapted to be hydrostatically separated before start-up; and wherein the first bearing ring and the second bearing ring are adapted to be hydrodynamically separated from each other after start-up; and wherein the bearing assembly system conveys thrust loads directly to the main frame.

12. A method for conveying fluid in a bearing assembly system installed in a rock crusher having a main frame, a main shaft, an eccentric and a crushing head, said method comprising:
   (a) providing a bearing assembly system, said bearing assembly system comprising:
      (i) a first bearing ring, said first bearing ring being disposed around the main shaft and on the eccentric;
      (ii) a second bearing ring, said second bearing ring being disposed adjacent to the first bearing ring and on the main frame;
      (iii) a third bearing ring, said third bearing ring being disposed around the main shaft and on the eccentric;
      (iv) a fourth bearing ring, said fourth bearing ring being disposed adjacent to the third bearing ring and on the crushing head;
      (iii) a means for conveying fluid to at least one of the first bearing ring and the second bearing ring and to at least one of the third bearing ring and the fourth bearing ring, said means for conveying fluid being adapted to convey a pressurized fluid;
   wherein at least one of the first bearing ring and the second bearing ring and at least one of the third bearing ring and the fourth bearing ring comprises a substantially closed fluid depression that is adapted to receive and collect the pressurized fluid, said substantially closed fluid depression comprising an inner circumference fluid depression wall that substantially prevents the pressurized fluid from being conveyed radially inwardly from the bearing rings and an outer circumference fluid depression wall that substantially prevents the pressurized fluid from being conveyed radially outwardly from the bearing rings; and wherein the first bearing ring and the second bearing ring are adapted to be hydrostatically separated before start-up; and wherein the bearing assembly system conveys thrust loads directly to the main frame; and
   (b) conveying fluid from the means for conveying fluid to at least one of the first bearing ring and the second bearing ring and to at least one of the third bearing ring and the fourth bearing ring.

* * * * *